CARRIER TELEGRAPH SYSTEM

Filed Nov. 30, 1949 4 Sheets-Sheet 1

INVENTORS
VICTOR J. TERRY
THOMAS F. S. HARGREAVES
BY HECTOR T. PRIOR
Percy P. Lantzy
ATTORNEY Oct. 7, 1952 V. J. TERRY ET AL 2,613,272

CARRIER TELEGRAPH SYSTEM

Filed Nov. 30, 1949 4 Sheets-Sheet 2

INVENTORS
VICTOR J. TERRY
THOMAS F.S. HARGREAVES
BY HECTOR T. PRIOR
Percy P. Lantzy
ATTORNEY INVENTORS
VICTOR J. TERRY
THOMAS F.S. HARGREAVES
BY HECTOR T. PRIOR
Percy P. Lantzy
ATTORNEY INVENTORS
VICTOR J. TERRY
THOMAS F. S. HARGREAVES
BY HECTOR T. PRIOR
Percy P. Lantzy
ATTORNEY Patented Oct. 7, 1952 2,613,272

UNITED STATES PATENT OFFICE 2,613,272

CARRIER TELEGRAPH SYSTEM

Victor John Terry, Thomas Frederick Stanley Hargreaves, and Hector Thomas Prior, London, England, assignors to International Standard Electric Corporation, New York, N. Y.

Application November 30, 1949, Serial No. 130,326
In Great Britain December 3, 1948

21 Claims. (Cl. 178—88)

The present invention relates to improvements in the receiving arrangements of electric carrier current telegraph systems, such as multichannel voice frequency systems.

In the usual amplitude modulation telegraph systems it is well known that as a result of the restricted frequency bandwidth which can be allotted to each channel, the substantially rectangular signal waves originally obtained from the transmitting teleprinter or other signalling device, appear at the receiver after demodulation in considerably rounded form. The signal received after demodulation is usually of the single current type, that is, a marking signal is represented by a current or voltage of a given value, and a spacing signal by zero current or voltage. It has been the usual practice to give the receiving circuits such transmission characteristics, that the times when the received signal amplitude passes through a value equal to half the maximum amplitude are spaced substantially in the same way as the vertical edges of the original transmitted rectangular signals, a bias equal to half the maximum amplitude is then applied and in this way the distortion due to the rounding of the signal waves is practically eliminated. A system of this type is described in detail in copending application Serial No. 23,438/48, filed April 27, 1948.

Since the maximum amplitude of the received signal waves depends on the attenuation of the line or other medium over which the signals are transmitted, which may be variable, it has been customary to obtain the necessary bias by a condenser storage arrangement from the received waves themselves, and if the circuit be given suitable time constants, the fact that there may sometimes be relatively long spaces between two marking signals, is not very important. However, the correct bias will only be obtained if the received marking signals always reach the same maximum amplitude.

A demand is now arising for an appreciable increase in the signalling speed without any increase in the channel bandwidth, and it has been found that with an increased signalling speed, the arrangements hitherto employed are unsatisfactory because the received signal amplitude cannot be caused to reach the same maximum value for short marking signals as for the long ones, if the requirement regarding the time-spacing of the half-amplitude points is also satisfied.

It is therefore the principal object of the present invention to overcome this difficulty which arises from the increased signalling speed.

According to the invention, this object is achieved by providing at the receiver two separate signal paths, one of which contains a shaping network which shapes the signal waves in such manner that the half-amplitude timing requirements are met, and the other path contains a different shaping network which ensures that the signal waves resulting from long or short marking signals reach substantially the same maximum amplitude, from which the proper bias potential may always be derived.

The point at which the signal path divides into two can be anywhere in the receiver, but is preferably as remote from the input end thereof as possible, for example, after the final demodulation.

The invention will be explained with reference to the accompanying drawings, in which.

Figure 1:
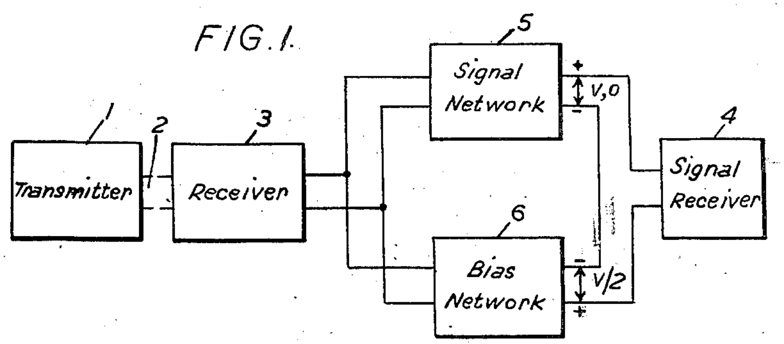
Fig. 1 shows a block schematic circuit diagram of a telegraph system incorporating a receiving arrangement according to the invention.

Fig. 1 shows a block schematic circuit diagram of an embodiment of the invention, which will be assumed to be applied to a carrier telegraph system. A transmitter 1 transmits carrier waves which are amplitude modulatd by telegraph signals such as teleprinter signals, for example, over a line or other communication medium 2 (shown dotted), to a receiver 3. According to the invention, the output of the receiver is connected over two parallel paths to a telegraph signal receiver 4 which might, for example, include a receiving teleprinter. The upper path includes a signal network 5, and the lower path includes a bias network 6.

The receiver 3 and the signal network 5 together include all the apparatus necessary for amplifying and demodulating the carrier waves received from the line 2, so that the telegraph signal wave is produced at the output of the signal network 5.

Figures 2, 3, 4, 5, 6, 11:
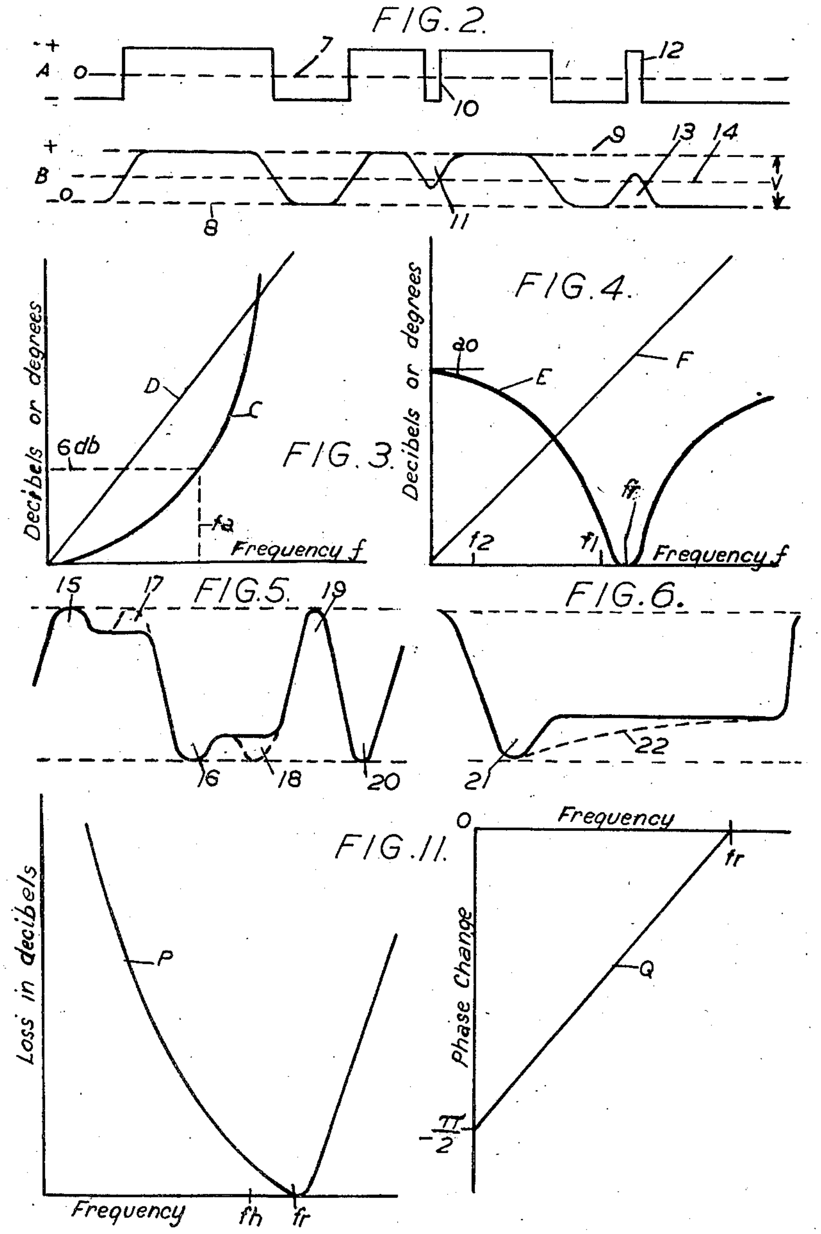
Figs. 2 to 6 (inclusive) show graphical diagrams used in the explanation of the operation of the circuit of Fig. 1.
Figs. 10 and 11 show graphical diagrams used in the explanation of the invention of the circuit of Fig. 1.

Thus referring to Fig. 2, curve A shows the rectangular signals produced by the telegraph instrument and emanating from the transmitter 1. These are generally of the double current form, that is, they are in the form of equal positive and negative voltages or currents with respect to a zero axis shown dotted at 7. The positive signals will be called "marking" signals, and the negative signals will be called "spacing" signals. When these rectangular signals are applied to modulate a carrier wave, the arrangement is generally such, that a carrier wave of constant amplitude is transmitted for marking signals, and no carrier wave for spacing signals, so the transmission over the line is effectively of single current type. When the modulated carrier wave is rectified at the receiving end, the recovered signal wave is also of single current type and may appear as shown by curve B of Fig. 2. On account of the restricted frequency bandwidth of the channel, the rectangular signals are considerably rounded, and the leading and trailing edges are appreciably inclined to the vertical, as indicated.

In curve B, the wave is confined between a zero axis 8 and a positive axis 9 corresponding to a voltage V.

If the marking or spacing signals are long enough, the curve has time to reach the axes 9 and 8, respectively. However with a short spacing signal such as 10, the corresponding wave 11 of curve B does not reach the zero axis 8, and with a short marking signal such as 12 the corresponding wave 13 does not reach the maximum axis 9.

The rectifier circuits for recovering the signal-wave may be either in the receiver 3 or in the signal network 5, Fig. 1. In either case, the signal network 5 will include a suitable equalising or shaping circuit so designed according to practice that the signal instants, that is, the time at which the signal wave B, Fig. 2, crosses the half-amplitude level 14 are spaced in the same way as the original signal transits of curve A. If a constant negative bias of V/2 be added to the signal wave B, the zero axis will be effectively shifted to the line 14 and a double current receiving instrument can then be operated at the times corresponding to the transits of curve B across the axis 14, which will be the same as the transit times of the original signal, curve A.

It has been the practice hitherto to obtain the bias voltage V/2 by rectifying the signal wave B with a circuit having a relatively high time constant. This is satisfactory so long as all the marking signals are long enough for the wave B to reach the axis 9. The arrangement however fails if there are any appreciable number of short marking signals such as 12, curve A, because the bias voltage which depends on the peaks of the wave B will be reduced thereby.

Such a situation will occur, for example, with teleprinter signals transmitted over a channel with a given bandwidth when the signalling speed has been sufficiently increased.

In order to overcome this difficulty according to the invention, the bias network 6 (Fig. 1) is provided with a shaping circuit which is different from that in the signal network 5, and is designed to distort the received signal wave so that the peaks corresponding to both short and long marking signals are substantially of the same amplitude, so that the bias voltage is maintained as the proper value V/2. The network 6, will of course, also contain means for rectifying the modulated carrier wave (unless it is included in the receiver 3) and also the means for deriving the bias voltage V/2 from the recovered signal wave after it has been suitably distorted. The outputs of the networks 5 and 6 are connected in series to the signal receiver 4 as shown, so that the bias voltage is in opposition to the signal voltage in order to obtain the double current output, as explained.

Figs. 3 and 4 show the overall transmission characteristics which the shaping circuits in the networks 5 and 6 should be designed to produce. Fig. 3 represents the frequency variation of loss in decibels and phase change in degrees as measured between the terminals in the transmitter 1 to which the rectangular signal waves (curve A Fig. 2) are applied, and the output terminals of the network 5. In the case of Fig. 4, the output terminals are those from which the distorted wave is obtained in the network 6 before rectification to produce the bias voltage.

The loss curve C in Fig. 3 corresponds to the formula loss=$20 \log_{10} \sec^2(f\pi/4fa)$ and where $f$ is the frequency variable and $fa$ is the dot frequency corresponding to the signalling speed. It will be noted that the loss is approximately 6 decibels at frequency $fa$.

The phase curve D is a straight line passing through the origin. These characteristics have been previously employed in telegraph circuits.

The loss curve E of Fig. 4 decreases from a relatively high value $a_0$ at zero frequency, to zero at a frequency a little above $f_1$ which is the dot frequency corresponding to the highest signalling speed which will be used over the channel. The loss thereafter increases. The phase curve F should preferably be a straight line passing through the origin.

With these characteristics, rectangular signals transmitted at dot frequency $f_1$ lose practically all their harmonics and will appear practically as sine waves. Signals transmitted at a relatively low dot frequency $f_2$ will retain some of their harmonics, but the fundamental will be attenuated as compared with the fundamental of frequency $f_1$. Fig. 5 shows how low and high frequency signals would be received over a channel with the characteristics of Fig. 4. The two low frequency waves have overshoots 15, 16 which are characteristics of a circuit with a sharp cut-off, and the form of the earlier part of the curve E, Fig. 4 accentuates this effect. The dotted overshoots 17 and 18 will also be obtained if the phase curve F is strictly linear, but this is difficult to achieve and so these overshoots are sometimes reduced or absent. The high frequency waves appear as single peaks 19 and 20, and by suitably choosing the form of the curve E, all the waves may be given a substantially uniform amplitude. Accordingly, the bias voltage obtained by peak rectifying the wave will be substantially the same for long or short signals. It will be clear that in order to obtain a suitable bias voltage from waves such as those shown in Fig. 5, the charging time of the holding condenser should be short, and the discharging time should be long. However, the bias voltage due to a single marking peak should not persist indefinitely otherwise it will not follow changes in the mean level of the received signals. In practice, however, the discharge time constant of the storage network is made as small as possible consistent with the maintenance of the bias over normal spacing periods.

This being the case, it is clear that the bias voltage V/2 will decrease appreciably during the period of a long marking signal because of the overshoot, as can be seen from Fig. 6. The bias voltage as initially determined by the peak 21 will decay to a lower value determined by the flat part of the signal, as indicated by the dotted line 22.

Figures 7, 8:
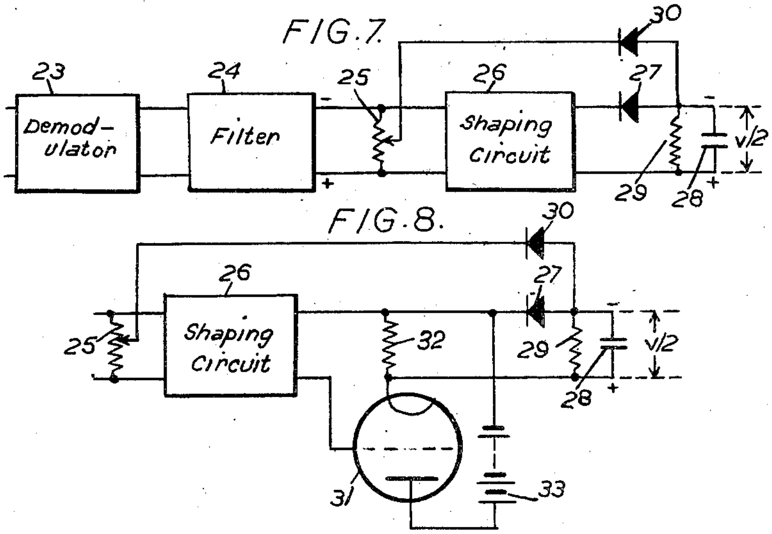
Fig. 7 shows a circuit of the bias network shown in Fig. 1.
Fig. 8 shows a modification of Fig. 7.

This can, however, be easily remedied by the arrangement shown in Fig. 7 which shows details of one form of the bias network 6 of Fig. 1. In Fig. 7 the element 23 is a conventional demodulator for recovering the signal wave from the modulated carrier. This is followed by a low pass filter 24, and the signal wave appears across resistance 25, in a form similar to that shown by curve B, Fig. 2. This is then distorted by the shaping circuit 26, which may take the form shown in Fig. 13, and which is designed to produce overall characteristics of the kind shown in Fig. 4. The bias voltage V/2 is then obtained by means of the rectifier 27, through which the storage condenser 28 is charged. The condenser is shunted by a discharging resistance 29. The shaping circuit 26 is by-passed by a second rectifier 30 connected between an adjustable tapping point on the resistance 25 and the upper end of the storage circuit 28, 29.

The demodulator 23 should be designed so that marking signals make the upper end of resistance 25 negative with respect to its lower end, and the rectifiers 27 and 30 should be poled to permit marking signals to charge the condenser 28.

It will be seen that the condenser can be charged either from the undistorted marking signals through rectifier 30 or from marking signals of the kind shown in Fig. 6 after distortion in the shaping circuit 26, through rectifier 27. The tapping on resistance 25 should be adjusted so that for a long marking signal the condenser 28 acquires the desired bias potential V/2. The shaping circuit 26 should be designed so that the potential acquired by the condenser 28 in response to the peak 21 (Fig. 6) is also V/2. It will thus be seen that for a long marking signal, after the peak 21 has passed, the potential of the condenser 28 will be maintained at V/2 from the tapping on the resistance 25 and the rectifier 27 will be blocked, because the potential applied by the shaping circuit 26 will be less than V/2. However, if there should be a succession of short marking signals similar to 13, curve B, Fig. 2, the potential V/2 in the condenser 28 will be produced by the peaks of the distorted signals at the output of the shaping circuit 26, through rectifier 27, and rectifier 30 will be blocked because the potential corresponding to the short marking signals 13 in resistance 25 will be less than V/2.

It should be mentioned that the signal network 5 will include elements similar to 23 and 24 (Fig. 7) except that the recovered marking signals must be of the opposite sign in order that the bias voltage at the output of network 6 (Fig. 1) may be in opposition to the signal voltage at the output of network 5. This latter network will also include a shaping circuit corresponding to 26, except that it will be designed to produce an overall characteristic of the type shown in Fig. 3, instead of the type shown in Fig. 4. There will be no elements corresponding to elements 27 to 30.

Although in many telegraph systems a marking condition is maintained during the intervals of transmission of signals, it can also happen that a spacing condition may persist for long periods. In that case the bias voltage will be reduced to zero and the first signals received after a long spacing period will therefore be incorrectly biassed.

In order to overcome this, it is only necessary to delay the appearance of the signals at the output of the network 5 (Fig. 1) sufficiently to allow the bias voltage to be built up in the condenser 28 (Fig. 7). As already mentioned, both networks 5 and 6 will contain filters which act as delay networks, and these filters can be designed to produce the desired difference of delay in the two paths, or a suitable additional delay network may be included in one of the paths to produce the desired result. It should be added that the preferred arrangement is such, that the bias voltage V/2 is just established when the first marking signal appears at the output of network 5 after a long spacing period. This means that the period of holding the bias voltage will not be unnecessarily increased by the delay in the appearance of the signals at the output of the upper path. The time-constant of the storage circuit 28, 29 can therefore be made the minimum, consistent with the maximum period between marking signals during normal signalling.

In order to make the requirements for the circuit clearer, a summary of the points alluded to in the preceding paragraphs will now be given.

In the bias path, the frequency response characteristic should fall off less rapidly with increase of frequency than in the signal path in which the response to the dot frequency $f_1$ may be little more than half the response to a much lower frequency such as $f_1/10$. In consequence of its squarer frequency response characteristic, the response of the bias path to an isolated space-to-mark transition produces an overshoot as shown at 15, Fig. 5, and a transition in the reverse sense produces an undershoot as shown at 16. Moreover if, as is desirable, there is no phase distortion, each transition is preceded by an excursion of amplitude equal to the overshoot or undershoot as shown dotted at 17 and 18 in Fig. 5.

When overshooting is used to provide the proper bias for long and short marking signals, it is essential that the charging time of the storage condenser should be short. This may be ensured by using a cathode-follower valve stage through which to charge the condenser, as will be described later.

So long as phase distortion is absent, the bias is prepared, and the bias condenser 28 is recharged, immediately before each transition either way, and it is not therefore necessary to provide a very large time-constant for the discharge of the stored bias voltage.

If, however, phase distortion is present to such an extent as to eliminate or seriously reduce the peaks at 17 and 18 Fig. 5, some other device must be employed to maintain the appropriate bias during a long marking interval. Suitable arrangements for this purpose are shown in Fig. 7, in which the bias network is by-passed by an auxiliary direct path which maintains the bias voltage at the proper value during the period of a long marking signal. The auxiliary path originates from a point where the steady-state amplitude matches the peak amplitude of the output from the bias path. If the wave from which the auxiliary bias is derived has overshoots, the charging time-constant for this path must be lengthened (for example, by including a series resistance, not shown), so as to prevent the overshoot from overcharging the condenser 28.

Rectifiers 27 and 30 ensure that the charge in condenser 28 corresponds to the voltage in the main bias path or the auxiliary bias path, whichever is greater.

A modification of Fig. 7 will now be described. Since the bias voltage V/2 has to be produced by peaks such as 16, 20 (Fig. 5) which are short compared with the interval between them, it is necessary, as already stated, that the charging circuit for the condenser 28 should have a low time-constant. If the output impedance of the shaping circuit 26 cannot be conveniently reduced to a sufficiently low value, a cathode-follower valve may be interposed between the output of the shaping circuit 26 and the rectifier 27, as shown in Fig. 8. A triode valve 31 has its cathode connected through resistance 32 to the upper output terminal of the shaping circuit 26, and its control grid to the lower output terminal. The cathode is also connected to the lower end of resistance 29. The high tension operating source 33 is provided for the valve in the usual way. It is well-known that the output resistance of the cathode-follower, which is also shunted by the resistance 32, can be quite low if the mutual conductance of the valve is high. In this way, the charging circuit for the condenser 28 may be given a very low time-constant.

It may be pointed out that if the charging time-constant is made sufficiently small, any transition from space to mark will be correctly biassed irrespective of what has gone before, and the discharge time-constant need only be large enough to hold the bias voltage until the next normal transition from mark to space occurs. In the case of a long marking signal, the subsequent transition to the spacing condition will be dealt with by the by-pass through the rectifier 30 (Fig. 7). If the discharge time-constant is made small by using a small storage condenser 28 it may be found that the charging time-constant can be made small enough without using the arrangement of Fig. 8.

In the arrangement which has been described, the division into the two paths was made just before the carrier wave was demodulated. However, it is clear that the division could have been made at an earlier point, but this would involve duplicating some or all of the apparatus in the receiver 3 and this would obviously be undesirable for economic reasons. In the arrangement described, the demodulator had to be duplicated because of the necessity for producing two signal waves of opposite sign. However, Fig. 9 shows another embodiment of the invention in which the shaping circuit in the lower or bias path includes differentiating arrangements for the signal wave by which it becomes possible to divide the paths at a point after the carrier wave has been demodulated.

Figure 9:
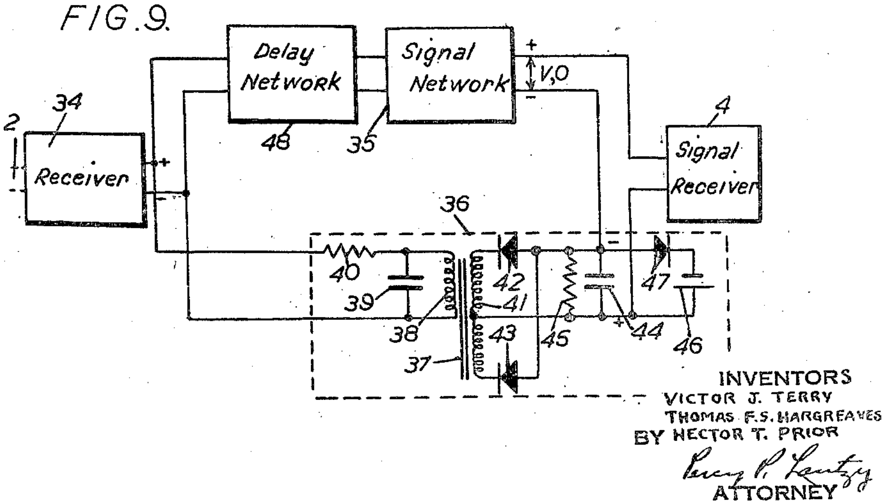
Fig. 9 shows partly in block schematic form, a circuit diagram of another embodiment of the receiving arrangement according to the invention.

In Fig. 9, the receiver 34 connected to the line 2 corresponds to the receiver 3 of Fig. 1, but includes the demodulator and filter necessary for recovering the signal wave which will be assumed to have the sign indicated in the figure. The signal network 35 is similar to the network 5 of Fig. 1 except that it does not contain a demodulator or filter, but will include a shaping circuit designed to produce an overall characteristic of the type shown in Fig. 3. The signal receiver 4 may be the same as in Fig. 1.

The bias network 36 comprises a differentiating transformer 37 having its primary winding 38 shunted by a condenser 39, and being connected to the output of the receiver 34 through a series resistance 40. The secondary winding 41 of the transformer 38 has a centre-tap and forms a full-wave rectifier circuit with two rectifiers 42 and 43. The rectified output is applied to charge a storage condenser 44 shunted by a discharge resistance 45 corresponding respectively to elements 28 and 29 of Fig. 7. The rectifiers 42 and 43 are directed so as to charge the upper plate of the condenser 44 negatively with respect to the lower plate. A negative bias source 46 is connected across the condenser 44 through a rectifier 47.

In order to adjust the relative delays of the two paths, a delay network 48 is shown connected in front of the signal network 35. It will be understood, however, that the relative delays introduced by the signal and bias networks 35 and 36 might be such as to require the network 48 to be placed in the lower path in front of the bias network 36 instead of in the upper path as shown. It will be obvious also that the delay network could alternatively be placed at the output end of the paths, or could be incorporated in one of the networks 35 or 36.

Figure 10:
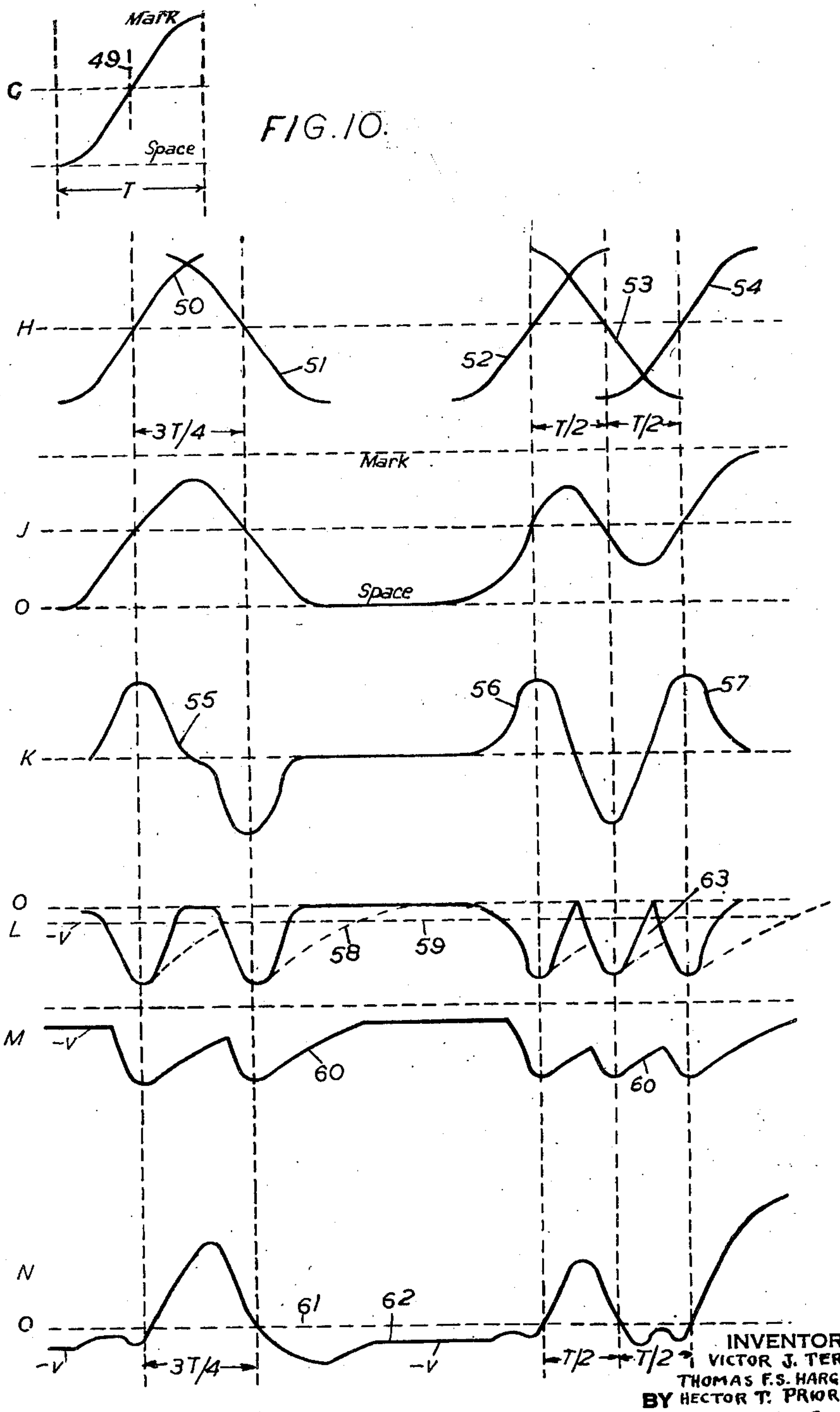

The operation of the circuit shown in Fig. 9 will be explained with reference to the curves shown in Fig. 10. Curve G shows a single transit from the spacing to the marking condition as it appears at the receiving end. The time taken for the transit to be substantially completed is indicated as T. The signal instant occurs at the half-amplitude level, at a time when the slope of the curve is a maximum. If transits follow one another at intervals less than T, some overlapping will occur at the receiving end, as can be seen from curve H, which shows two transits 50, 51 at an interval of 3T/4 and three more, 52, 53, 54 at intervals of T/2. Curve J shows the received signal wave resulting from the overlapping of these transits. It has been found that for transmission channels normally encountered in practice, so long as the interval between two transits is not less than about T/2, the signal instants are still at the half amplitude level and occur at points in the curves at which the slope is a maximum. This may however, not hold for channels having certain unusual characteristics.

As already explained with reference to Fig. 9, the signal wave is differentiated by the transformer circuit in the bias network 36 and the result of the differentiation is shown in curve K. A positive or a negative differential pulse is produced having maximum amplitude at each signal instant. The full-wave rectifier circuit associated with the transformer 37 inverts the positive pulses 55, 56 and 57, and the resulting wave shown by curve L is applied to charge the condenser 44. The condenser potential however, does not follow the relatively steep trailing edges of the pulses in curve L, but decays more slowly as indicated by the dotted lines such as 58. Furthermore, the source 46, whose potential $-v$ is represented by the horizontal dotted line 59, prevents the condenser potential from falling below the value represented by this line, because the rectifier 47 would then become unblocked thus effectively connecting the source 46 across the condenser. It follows therefore, that the potential variation of the condenser 44 will be represented by the curve M. This is the bias required for the signal wave at the output of the signal network 35.

The amplitude of the wave M should be adjusted in any convenient way so that the amplitudes of the negative peaks 60 are equal to the half amplitude V/2. Also the relative delay of the two paths should be adjusted so that these negative peaks occur at the signal instants. The wave applied to the signal receiver 4 is shown by curve N, which is the sum of the curves J and M. The important feature of curve N is that the signal wave always crosses the zero amplitude axis 61 at the signal instants, and so the signal device 4 will be operated without distortion.

It will be seen that the bias source 46 assures that during any spacing interval a suitable negative voltage is applied to hold the signal device so that it will not be affected by noise voltages. This can be seen at 62 in curve N.

It may be pointed out that the storage condenser 44 is necessary in this circuit because the trough 63 shown between two differential pulses in curve L would otherwise produce additional unwanted transits.

The differentiating circuit comprising the transformer 37 and elements 39 and 40 should preferably have the characteristics indicated in Fig. 11. Curve P represents the loss in decibels in relation to the frequency as measured between the input terminals of the bias network 36, and the terminals of the secondary winding 41 of the transformer 37, the rectifiers being supposedly disconnected. Curve Q represents the corresponding phase change. In curve P, $f_h$ is the upper frequency of the pass band of the channel over which the signals are transmitted and $f_r$ is the resonance frequency of the transformer 37 shunted by the condenser 29 which should be chosen to be a little higher than $f_h$. The loss below $f_r$ should be reduced at the rate of about 6 decibels per octave of frequency. Above $f_r$ the loss should preferably increase as rapidly as possible in order to minimise noise and interference between neighbouring channels. The phase curve Q should preferably be linear, the phase varying from $-\pi/2$ at zero frequency to zero at $f_r$. The simple network shown in Fig. 9 can be made to meet these requirements sufficiently closely.

It should be pointed out, that the discharging time-constant of the storage circuit 44, 45 can be of the order of T/2. Thus the time-constant might be as much as 1000 times shorter than is required for the conventional arrangements.

The arrangement shown in Fig. 9 has several important advantages over that of Fig. 7 or 8. In this latter arrangement, the transition to a marking condition after a long period spacing condition has to be biassed from a subsequently attained amplitude maximum, and thus involves delaying the signal before applying the bias voltage. Since a transition from the marking to the spacing condition is biassed from a previously attained maximum, the delay entails the storage of the corresponding bias voltage for an additional period. In the arrangement of Fig. 9, the generation of the differential pulses which provide the bias, occurs at about the same time as the signal instant, and although a delay network is shown in Fig. 9, this is only required to correct slight differences in the delay of the two paths, and does not increase the discharge time-constant of the storage circuit, which, as already mentioned, will be of the order of 1000 times less than in the conventional arrangements. The time-constant in the case of Fig. 7 or 8 is of the order of ten times less than in the conventional arrangements.

Another advantage of Fig. 9 is, that owing to the transformer 37 in the bias network, no direct current is transmitted, and this permits the bias voltage to have either sign irrespective of the sign of the marking signals applied to the bias network. This makes it possible to divide into the two paths after demodulation of the signal, thus reducing duplication of apparatus to a minimum.

A further advantage is that the performance of the bias network approximates more closely to the underlying theory, leaving less need for empirical adaptation.

Figure 12:
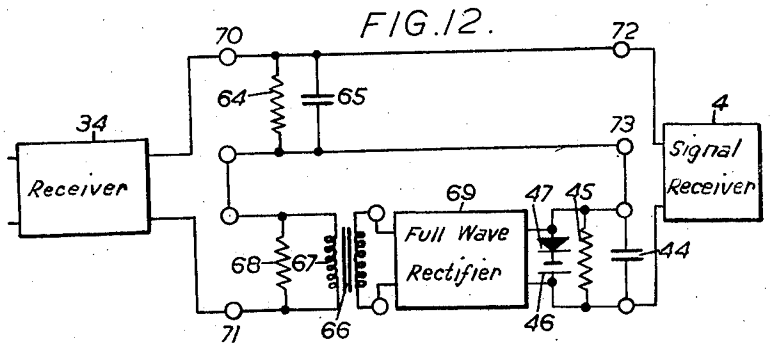
Fig. 12 shows a modified form of the circuit of Fig. 9.

Fig. 12 shows a modified form of Fig. 9 which however, operates on similar principles. The signal and bias paths in this case have their input circuits connected in series instead of in parallel. The signal path includes only a resistance 64 and a condenser 65 which are connected in shunt to the path and which constitutes the signal network. The bias path comprises a transformer 66, similar to the transformer 37 of Fig. 9, the primary winding 67 of which, is shunted by a resistance 68. The transformer 66 is connected to a full-wave rectifier 69 which may be arranged in the same way as is shown in Fig. 9. The output of the rectifier 69 is connected to the elements 44 to 47 as before.

To a first approximation, the impedance measured across the primary winding 67 (if disconnected from the resistance 68) is substantially equivalent to an inductance L shunted by a resistance R. If $R_1$ and $R_2$ are the values of the resistances 64 and 68, and C is the capacity of the condenser 65, then $R_2$ should be chosen so that $1/R+1/R_2=1/R_1$, and $R_1$, L, and C should be chosen so that $R_1^2=L/C$.

In these circumstances, the impedance presented to the output of the receiver 34 will be a constant resistance $R_1$ at all frequencies. By this choice, there will be no inconvenient interaction between the filter included in the receiver 34 and the rest of the circuit, so that the two parts can be designed and adjusted separately. Sufficient freedom is still left to select $R_1$, L and C to meet the requirements for the signal and bias networks already explained with reference to Fig. 9.

In practice, the condenser 44 and resistance 45 will produce a load on the rectifier 69 which varies with frequency and this may cause corresponding frequency variations of the values of L and R which are not negligible. In this case, the rectifier 69 may be coupled to the resistance 45 through a valve arranged as a cathode-follower similarly to the valve 31 in Fig. 8, in which the resistance 45 with the condenser 44 connected in parallel, would replace the resistance 32 in series with the cathode. In this case, the rectifier should be terminated with an appropriate load resistance. The voltage-frequency characteristic from the terminals 70, 71 to the terminals 72, 73 will be that of a low-pass filter, and by suitable design of the other filters in the receiver 34, can be conveniently designed to produce the necessary overall characteristic for the signal path.

Figure 13:
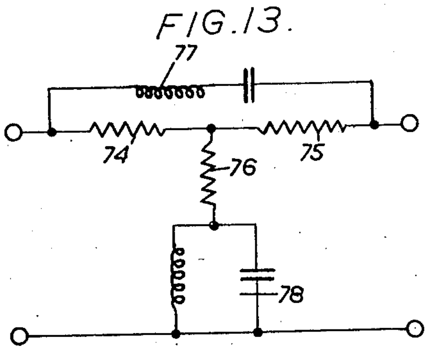
Fig. 13 shows a schematic circuit diagram of a shaping network suitable for use in the circuit of Fig. 7 or 8.

Fig. 13 shows one possible form of the shaping network 26 shown in Figs. 7 and 8. It is a well-known type of constant resistance equaliser comprising a T-network of resistances 74, 75, 76 with a series-resonant circuit 77 bridged across the series resistances 74 and 75, and a parallel-resonant circuit 78 connected in series with the shunt resistance 76. Referring to Fig. 4, the attenuation of the resistance network should be chosen to be equal to the zero frequency loss $a_0$ desired for the equaliser, and the two resonant circuits should be tuned to the frequency $f_r$. The characteristic impedance of the equaliser will be equal to that of the resistance network, which should be chosen to match the impedances of the circuit in which the equaliser is connected.

Although it has been assumed for clearness that the marking condition of the received signal wave corresponds to a positive voltage or current, these arrangements can easily be adapted for the opposite condition. Practically the only changes necessary are to reverse all the rectifiers in Figs. 7, 8 and 9, to reverse the connections to the valve 31 in Fig. 8 and to reverse the polarity of the source 46 in Fig. 9.

Furthermore, although the signals have been assumed to be transmitted over a carrier channel, this is not essential. The principles of the invention are also applicable for example, to the case in which the signals be transmitted directly over a cable or other metallic circuit having a restricted transmission bandwidth.

While the principles of the invention have been described above in connection with specific embodiments and particular modifications thereof, it is to be clearly understood that this description is made only by way of example, and not as a limitation on the scope of the invention.

What is claimed is:

1. An electric telegraph receiver for receiving a signal wave, said receiver comprising means for converting said signal wave into a second signal wave having a maximum slope at predetermined times and having an amplitude dependent upon the amplitude of said first-mentioned signal wave, means for converting said first-mentioned signal wave into a third signal wave having a predetermined maximum amplitude substantially independent of the amplitude of said first-mentioned second wave, means for converting said third signal wave into a biasing voltage and means for combining said second signal wave and said voltage.

2. An electric telegraph receiver for receiving a periodic signal wave, said receiver comprising means for converting said signal wave into a second signal wave having a maximum slope at predetermined times and having an amplitude dependent upon the amplitude of said first-mentioned signal wave, means for converting said first-mentioned signal wave into a third signal wave having a predetermined maximum amplitude at said predetermined times, said maximum amplitude being substantially independent of the amplitude of said first-mentioned signal wave, means for converting said third signal wave into a biasing voltage and means for combining said second signal wave and said biasing voltage.

3. An electric telegraph receiver for receiving a periodic signal wave, said receiver comprising means for converting said signal wave into a second signal wave having a maximum slope at points on said second wave where the amplitude of said second wave is equal to half of its maximum amplitude, said second wave having an amplitude dependent upon the amplitude of said first-mentioned signal wave, means for converting said first-mentioned signal wave into a third signal wave having a series of amplitude maxima, all of substantially the same value, said maxima occurring at times corresponding to said points on said second wave and being substantially independent of the amplitude of said first-mentioned signal wave, means for converting said third signal wave into a biasing voltage and means for combining said second signal wave and said biasing voltage in opposition.

4. An electric telegraph receiver for receiving telegraph signals from a channel having a predetermined band width, said receiver comprising a pair of circuit paths, means for impressing said signals on both said paths, means in one of said paths for converting said signals into second signals having maximum slopes at predetermined times and having amplitudes dependent upon the amplitudes of the received signals, means in the other of said paths for converting said received signals into third signals having predetermined maximum amplitudes substantially independent of the amplitudes of said received signals, said last-mentioned means comprising a shaping circuit having a loss which decreases from its value at zero frequency to a minimum value at a frequency slightly above the highest frequency in said channel band and which above said minimum value frequency increases with an increase in frequency, means in said other path for converting said third signals into a biasing voltage and means for combining said second signals with said biasing voltage.

5. An electric telegraph receiver for receiving telegraph signals from a channel having a predetermined band width, said receiver comprising a pair of circuit paths, means for impressing said signals on both said paths, means in one of said paths for converting said signals into second signals having maximum slopes at predetermined times and having amplitudes dependent upon the amplitudes of the received signals, means in the other of said paths for converting said received signals into third signals having predetermined maximum amplitudes substantially independent of the amplitudes of said received signals, said last-mentioned means comprising a shaping circuit having a loss which decreases from its value at zero frequency to a minimum value at a frequency slightly above the highest frequency in said channel band and which above said minimum value frequency increases with an increase in frequency, means in said other path for converting said third signals into a biasing voltage comprising a rectifier and a condenser connected in series to said shaping circuit and means for combining said second signals with said biasing voltage.

6. An electric telegraph receiver for receiving telegraph signals from a channel having a predetermined band with, said receiver comprising a pair of circuit paths, means for impressing said signals on both said paths, means in one of said paths for converting said signals into second signals having maximum slopes at predetermined times and having amplitudes dependent upon the amplitudes of the received signals, means in the other of said paths for converting said received signals into third signals having predetermined maximum amplitudes substantially independent of the amplitudes of said received signals, said last-mentioned means comprising a shaping circuit having a loss which decreases from its value at zero frequency to a minimum value at a frequency slightly above the highest frequency in said channel band and which above said minimum value frequency increases with an increase in frequency, means in said other path for converting said third signals into a biasing voltage comprising a vacuum tube having a cathode and a control electrode, a rectifier and a condenser connected in series to said cathode and means for connecting said control electrode to said shaping circuit and means for combining said second signals with said biasing voltage.

7. In a receiver for receiving telegraph signals, a biasing circuit comprising means for converting said signals into second signals each having a predetermined maximum amplitude, charging and storing means connected to said converting means and means for applying said first-mentioned signals to said charging and storing means.

8. In a receiver for receiving telegraph signals, a biasing circuit comprising means for differentiating said signals, a rectifier and a condenser connected in series to said differentiating means and means for applying said first-mentioned signals in unmodified form to said condenser comprising a further rectifier connected in series with said condenser.

9. In a receiver for receiving telegraph signals, a biasing circuit comprising means for differentiating said signals, a vacuum tube having a cathode and a control electrode, said control electrode being connected to said differentiating means, charging and storing means connected to said cathode and means for applying said first-mentioned signals to said charging and storing means.

10. In a receiver for receiving telegraph signals, a biasing circuit comprising means for differentiating said signals, a vacuum tube having a cathode and a control electrode, said control electrode being connected to said differentiating means, a rectifier and a condenser connected in series to said differentiating means and a rectifier connected between the input of said differentiating means and said condenser.

11. In a receiver for receiving telegraph signals over a channel having a predetermined pass band, a biasing circuit comprising means for differentiating said signals including a circuit having a loss which decreases substantially at the rate of 6 decibels per octave of frequency up to a frequency slightly higher than the maximum frequency of said pass band and thereafter increases rapidly with frequency, charging and storing means connected to said differentiating means and means for applying said first-mentioned signals to said charging and storing means.

12. An electric telegraph receiver for receiving telegraph signals, said receiver comprising a pair of circuit paths, means for impressing said signals on both said paths, means in one of said paths for converting said signals into second signals having maximum slopes at predetermined times, means in the other of said paths for differentiating the received signals, charging and storing means connected to said differentiating means and means for combining the output of said charging and storing means with said second signals.

13. An electric telegraph receiver for receiving telegraph signals, said receiver comprising a pair of circuit paths, means for impressing said signals on both said paths, means in one of said paths for converting said signals into second signals having maximum slopes at predetermined times, means in the other of said paths for differentiating the received signals, charging and storing means connected to said differentiating means, means for applying said received signals to said charging and storing means and means for combining the output of said charging and storing means with said second signals.

14. An electric telegraph receiver for receiving telegraph signals, said receiver comprising a pair of circuit paths, means for impressing said signals on both said paths, means in one of said paths for converting said signals into second signals having maximum slopes at predetermined times, means in the other of said paths for differentiating the received signals, a rectifier and a condenser connected in series to said differentiating means, a further rectifier connected between the input of said other path and said condenser and means for interconnecting said condenser and said converting means.

15. An electric telegraph receiver for receiving telegraph signals, said receiver comprising a pair of circuit paths, means for impressing said signals on both said paths, means in one of said paths for converting said signals into second signals having maximum slopes at predetermined times, means in the other of said paths for differentiating the received signals, a condenser, a rectifier connected between said differentiating means and said condenser, a source of direct current voltage and a further rectifier connected in series with each other and connected in parallel with said condenser and means for combining and utilizing the output of said charging and storing means and said second signals.

16. An electric telegraph receiver for receiving telegraph signals, said receiver comprising a pair of circuit paths having their inputs connected in series, means for impressing said signals on both said paths, one of said paths comprising a resistance and a condenser connected in parallel across its input, means in the other of said paths for differentiating the received signals comprising a resistance and an inductance connected in parallel across its input, a further condenser, a rectifier connected between said further condenser and said differentiating means and means connecting said further condenser in series with the output of said one path.

17. A receiver according to claim 16 wherein said resistances, said first-mentioned condenser and said inductance are so chosen that the impedance of said inputs is substantially a constant resistance at all frequencies.

18. A telegraph receiver for receiving telegraph signals including signals having predetermined durations, said receiver comprising means for converting said signals into second signals having predetermined slopes at predetermined times, means for converting said first-mentioned signals into third signals having amplitudes dependent upon the slopes of said first-mentioned signals, charging and storing means connected to said last-mentioned converting means for producing a biasing voltage, said charging and storing means having a charging time which is short relative to said durations and having a discharging time permitting substantial discharge of said storing means in a time no greater than the longest of said durations and means for combining the outputs of said charging and storing means and of said first-mentioned converting means.

19. A telegraph receiver for receiving telegraph signals including signals having predetermined durations and slopes, said receiver comprising means for converting said signals into second signals having predetermined slopes at predetermined times, means for converting said first-mentioned signals into third signals having amplitudes dependent upon the slopes of said first-mentioned signals, charging and storing means connected to said last-mentioned converting means for producing a biasing voltage, said charging and storing means having a charging time which is short relative to said durations and having a discharging line of the order of one-half the duration of said first-mentioned slopes and means for combining the outputs of said charging and storing means and of said first-mentioned converting means.

20. A telegraph receiver for receiving telegraph signals including signals having predetermined durations, said receiver comprising means for converting said signals into second signals having predetermined slopes at predetermined times, means for converting said first-mentioned signals into third signals having amplitudes dependent upon the slopes of said first-mentioned signals, charging and storing means comprising a condenser and a resistance connected in parallel and a rectifier connected between said last-mentioned converting means and said condenser, said charging and storing means having a charging time which is short relative to said durations and having a discharging time permitting substantial discharge of said storing means in a time no greater than the longest of said durations and means for combining the outputs of said charging and storing means and of said first-mentioned converting means.

21. A telegraph receiver for receiving telegraph signals including signals having predetermined durations and slopes, said receiver comprising means for converting said signals into second signals having predetermined slopes at predetermined times, means for converting said first-mentioned signals into third signals having amplitudes dependent upon the slopes of said first-mentioned signals, charging and storing means comprising a condenser and a resistance connected in parallel and a rectifier connected between said last-mentioned converting means and said condenser, said charging and storing means having a charging time which is short relative to said durations and having a discharging time of the order of one-half the duration of said first-mentioned slopes and means for combining the outputs of said charging and storing means and of said first-mentioned converting means.

VICTOR JOHN TERRY.
THOMAS FREDERICK STANLEY HARGREAVES.
HECTOR THOMAS PRIOR.

REFERENCES CITED

The following references are of record in the file of this patent:

UNITED STATES PATENTS

| Number | Name | Date |
|---|---|---|
| 2,248,857 | Erickson | July 8, 1941 |

FOREIGN PATENTS

| Number | Country | Date |
|---|---|---|
| 591,898 | Great Britain | Sept. 2, 1947 |